Aug. 25, 1925.
W. A. FASSNACHT
TEXTILE SPOOL
Filed Feb. 23, 1922
1,551,247
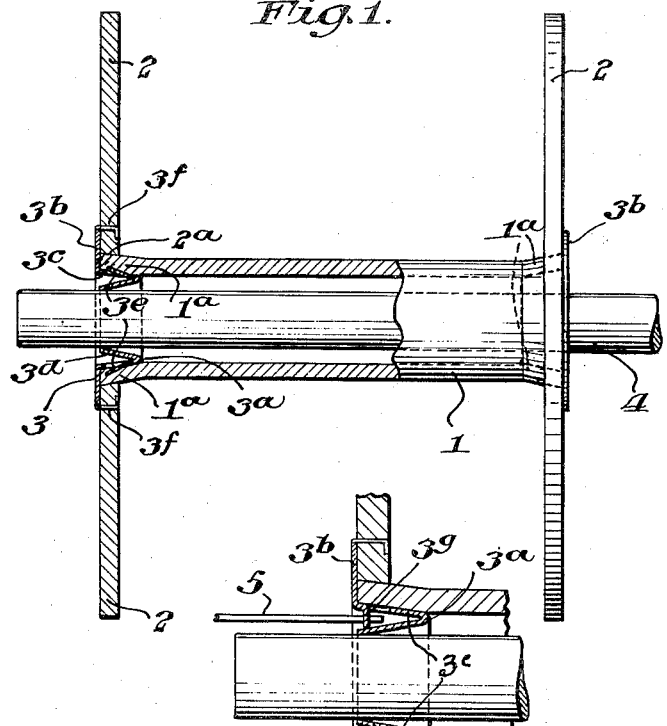
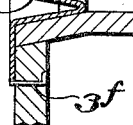
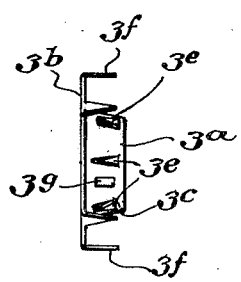
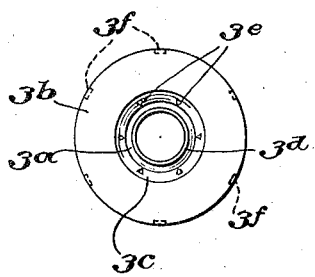
Inventor:
William A. Fassnacht,
By Butler & Denny
Attorneys.

Patented Aug. 25, 1925.

1,551,247

UNITED STATES PATENT OFFICE.

WILLIAM A. FASSNACHT, OF PHILADELPHIA, PENNSYLVANIA.

TEXTILE SPOOL.

Application filed February 23, 1922. Serial No. 538,461.

*To all whom it may concern:*

Be it known that I, WILLIAM A. FASSNACHT, a citizen of the United States, residing in the city of Philadelphia, county of Philadelphia, and State of Pennsylvania, have invented a certain new and useful Textile Spool, of which the following is a specification.

My invention is a spool adapted for winding, holding and feeding threads generally, but particularly in the use of textile machinery, and its primary object is to provide a strong and convenient construction, simply and economically.

The characteristic construction of my improved spool, in its preferred form, is found in the combination of paper or fibre board disks with the ends of a paper tube set therein and fixed by pressed sheet metal couplings having internally and externally coned bodies engaged in the ends of the tube, which are expanded thereby, and peripheral flanges with tines thereon, the flanges lapping the joints of the tubes with the disks, and the tines being engaged in the disks, and the couplings having means for the engagement of a device for rotating them on a spindle.

In the accompanying drawings, Fig. 1 is a part sectional side view of a spool embodying the invention; Fig. 2 is a side elevation of a detached coupling of the character used for fixing the disks on the ends of the cylindrical body of the spool; Fig. 3 is a face view of the detached coupling, and Fig. 4 is an enlarged broken sectional view of details of the construction.

The invention, in its specific form illustrated in the drawing, comprises the combination of a tubular body 1 (preferably of paper or manufactured fibre) with disks 2 (preferably of paper or fibre board), which are set on the respective ends of the tubular body, and couplings 3 having conical bodies 3ª forced into the respective ends of the tube or tubular body and flanges 3ᵇ fixed to the faces of the disks.

The disks 2 have therein the holes 2ª which are flared outwardly, and the tube 1 has its respective ends 1ª expanded in these holes by forcing the coupling bodies 3ª into such ends.

The couplings 3, which are died out from sheet metal, have their bodies 3ª formed by the oppositely tapered concentric cone frustra 3ᶜ and 3ᵈ, the frustra 3ᶜ having the teeth or claws 3ᵉ cut therefrom with their points bent outwardly so as to engage the inner surface of the tube ends. The flanges or faces 3ᵇ of the couplings, extending at right angles to the respective body axes, engage the respective ends of the tube 1 and the outer faces by the disks 2, to which they are fixed, these flanges or faces having the peripheral tines 3ᶠ bent at right angles thereto and driven through and upset in the disks 2.

The sections 3ᶜ have the respective lugs 3ᵍ cut therefrom and bent inwardly to provide means for revolving the spool on the spindle 4 by a revolving finger 5 adapted to enter between the parts 3ᶜ and 3ᵈ to engage the part 3ᵍ.

The spool thus formed is not only strong and inexpensive, but it is adapted for ready application to the rod 4 on which it must be placed and revolved. The small ends of the conical members 3ᵈ are exposed so that the registration of such ends and their entry upon the end of the rod is easily effected. When the spool has been entered on and moved over the rod until the second coupling is in position in its longitudinal movement to pass thereover, the larger end of the part 3ᵈ readily slips on the rod and the smaller end of such part is thus guided to position, the smaller ends of the parts 3ª bearing on the rod by which the spool is journalled.

It will be understood that a cement or adhesive substance may be used between the couplings and the members with which they are connected to supplement the frictional and mechanical action between the parts.

Having described my invention, I claim:

1. A device comprising a disk, a tube having a flaring end set in said disk, and a coupling having a flaring body set in said end of the tube and a flange fixed to said disk.

2. A spool comprising a disk, a tube having an end fixed to said disk, and a coupling engaging together said tube and disk, said coupling having a support-engaging member tapering axially toward the outer end of said spool.

3. A spool comprising a disk, a body having a hollow end set in said disk, and a coupling having a tapered body set in said hollow end and a flange fixed to said disk, said tapered body having reversely tapered conical sections.

4. A spool comprising a pair of fibre disks, a fibre tube having flared ends set in the respective disks, and couplings having bodies with conical surfaces fixed in said ends, whereby the latter are expanded, and flanges projecting outwardly from the larger ends of said conical surfaces, whereby said disks are engaged, said flanges provided with tines engaged in said disks.

5. A spool comprising a pair of fibre disks, a fibre tube having expanded ends set in the respective disks, and sheet metal couplings each having a body with oppositely tapered external and internal conical sections adapted respectively to be fixed in a tube end and to be sleeved on a spindle, each external section having a peripheral flange on the larger end thereof engaged to the corresponding disk.

6. A spool comprising a disk, a body having a hollow end set in said disk and, connecting said body and disk, a coupling having a tapered section set in said end and an oppositely tapered concentric section providing a bearing for said spool, said coupling having a part disposed between said sections for the engagement of means for revolving said spool.

In testimony whereof I have hereunto set my name this 20th day of February, 1922.

WM. A. FASSNACHT.